Oct. 15, 1929.  E. SACHS  1,731,728
COASTER BRAKE FOR VEHICLES
Filed Sept. 6, 1927

Inventor
Dr. Ernst Sachs
By Dowrell & Dowrell
Attorneys

Patented Oct. 15, 1929

1,731,728

UNITED STATES PATENT OFFICE

ERNST SACHS, OF SCHLOSS MAINBERG, NEAR SCHWEINFURT, BAVARIA, GERMANY

COASTER BRAKE FOR VEHICLES

Application filed September 6, 1927, Serial No. 217,848, and in Germany September 14, 1926.

The invention relates to the expansible brake sleeves in internal brakes for wheel hubs, especially in back-pedalling coaster-brakes for bicycles or similar vehicles, and more particularly to such brakes wherein a brake-cylinder comprising a number of cylindrical segments is enclosed within a brake-mantle of braking material.

The object of this invention is to provide a double-acting brake with braking surfaces on the outside and inside of the brake-mantle, while yet maintaining the longitudinal relation of the relatively rotatable brake cylinder and its mantle, so that proper operation of the brake will not be prevented by a disarrangement or relative displacement of the main parts thereof.

This object is attained in a very simple and effective manner by interconnecting the elements of the brake through an annular split ring engaging in a circumferential groove in the periphery of the brake cylinder and in a similar facing groove provided on the inside of the mantle, while a slit of the mantle in substantially longitudinal direction allowing expansion thereof is disposed so as to cross or traverse the longitudinal or axial slits of the brake cylinder, any obstacle to the rotation of the mantle upon the cylinder being thus prevented, notwithstanding the fact that elements are locked against relative axial displacement by the same means.

An embodiment of the invention is illustrated in the accompanying drawing which forms a part of this specification and in which—

Figure 1:
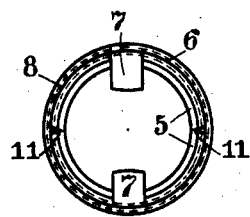
Figure 2:
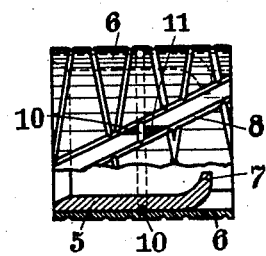

Figure 1 is an end view of the brake member;

Figure 2 a side elevation thereof, partly in section; and

Figure 3:
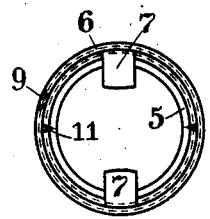
Figure 4:
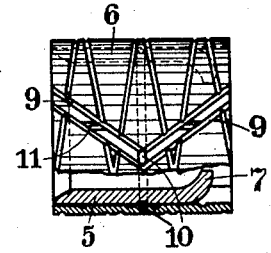

Figures 3 and 4 represent corresponding views of a modified embodiment of the invention.

Like numerals denote like parts throughout all figures of the drawing.

Referring to Figs. 1 and 2, the illustrative sleeve-shaped expansible brake member is composed of a main body or cylinder 5 made preferably of steel and a brake-mantle or shell 6 of braking material, such as soft metal or alloy, such for example as brass, which encloses the main body and is preferably of the same axial length as said body. In the construction shown, the main body 5 comprises two cylinder segments having opposite inwardly directed lugs 7 serving for non-rotatably securing the said body.

The brake mantle or shell 6 consists of a one-piece sleeve formed with a longitudinally disposed slit 8 and bearing upon the segments of the main body with resilient pressure, said slit being extended in a helical line across or over a part of the periphery of the brake mantle (Fig. 2). The effect of this arrangement is that during the braking operation, the brake member will be pressed uniformly against the inner surface of the hub owing to the fact that the slit in the brake mantle does not at any time coincide with the axial slits 11 of the main body 5, but instead crosses the latter slits. The result of this construction is that a uniform expansion of the brake mantle is produced at all points while the mantle is free to turn upon the main body. Furthermore the brake mantle will also contract easily over the slits 11 of the main body.

The same result may be obtained with a construction such as shown in Figs. 3 and 4, wherein the slit 9 in the mantle 6 is V-shaped or formed by angularly disposed slit-portions extending in opposite directions from a point midway of the brake in helical or spiral lines of large pitch.

In order to effectively prevent axial movement of the brake mantle relatively to the main body, an annular spring 10 is provided between said body and mantle, said spring being received and held within opposing grooves in the outer periphery of the main body and the inner periphery of the brake mantle so that it is equally embedded in the two members. Said spring moreover facilitates the assembly of the parts or segments forming the brake body, and independently serves to contract the main body.

In Figs. 2 and 4, oil grooves are represented in the outer periphery of the mantle. Similar grooves may be made in the inner face or periphery of the mantle, as indicated in Fig. 4.

As the brake mantle is capable of turning freely upon the main-body, it may, when the brake is expanded, either be held stationary upon the main-body and slide frictionally on the inner face of the hub-barrel (not shown), or rotate in unison with the hub-barrel and slide on the circumference of the main-body, according to conditions. It may also happen that the brake-mantle will slide relatively to both of said counter-faces or members simultaneously. Slitting of the mantle as hereinbefore described facilitates rotation thereof on the main body, while the segments of the latter are prevented from relative lateral displacement by the mantle in conjunction with the annular spring. From this construction soft braking and easy expansion and contraction of the brake results.

Expanding or spreading of the described brake member may be effected in different ways, as for example, by means of conical brake applying members engaging the interiorly-beveled ends of the main body, as more fully described in my prior Patents Nos. 777,811, dated December 20, 1904, and 960,710, dated June 7, 1910.

It will be perceived from the foregoing description that the invention is capable of various embodiments. What I, therefore, claim as my invention is—

1. In an internal hub brake, the combination with an expansible cylindrical main body of an elastic brake mantle rotatably mounted on said body, said body and mantle being formed with opposed circumferential grooves in their contacting surfaces, and an annular spring received in said grooves so as in effect to be embedded partly in the main body and partly in the brake-mantle, substantially as described.

2. In an internal hub brake, the combination of a cylindric main body composed of segments, a slitted brake mantle rotatably mounted on said body, and an annular spring fixed between said mantle and body and adapted to interconnect the same against relative axial movement.

3. In an internal hub brake, the combination of a main body composed of segments, an annular spring received partly in a circumferential groove formed in said body, and a split brake mantle rotatably mounted on the main body and formed with a circumferential groove opposing the groove in said body for receiving the remaining part of said spring.

4. In an internal hub brake, the combination of a main body composed of segments, a brake mantle rotatably mounted on said body and having a substantially helical slit longitudinally thereof, and an annular spring engaging in opposed circumferential grooves formed in the contacting surfaces of said main body and mantle.

5. In an internal hub brake, the combination of a main body comprising segmental parts, a split brake mantle rotatably mounted on said body with the slit therein disposed crosswise of the abutting joints of the main body parts, and an annular spring member interposing said main body and mantle on a transverse plane and adapted to interconnect the same against relative axial displacement.

In testimony whereof I have signed my name to this specification.

DR. ERNST SACHS.